Figure 1:
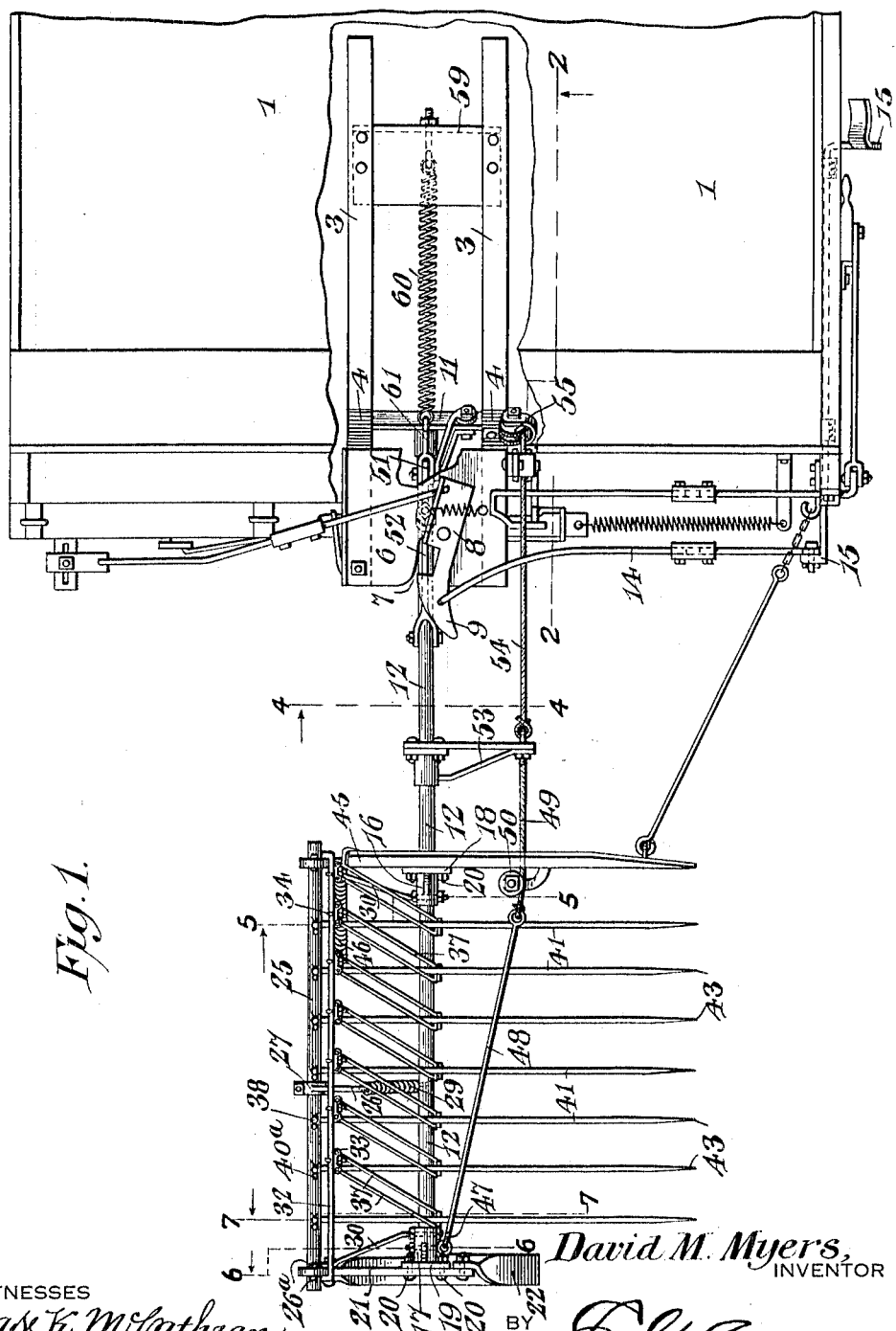

D. M. MYERS.
HAY AND GRAIN LOADER.
APPLICATION FILED JUNE 6, 1913.

1,105,916.

Patented Aug. 4, 1914.
4 SHEETS—SHEET 1.

WITNESSES
Jas. K. McCathran
F. T. Chapman

David M. Myers,
INVENTOR
BY
E. G. Siggers
ATTORNEY

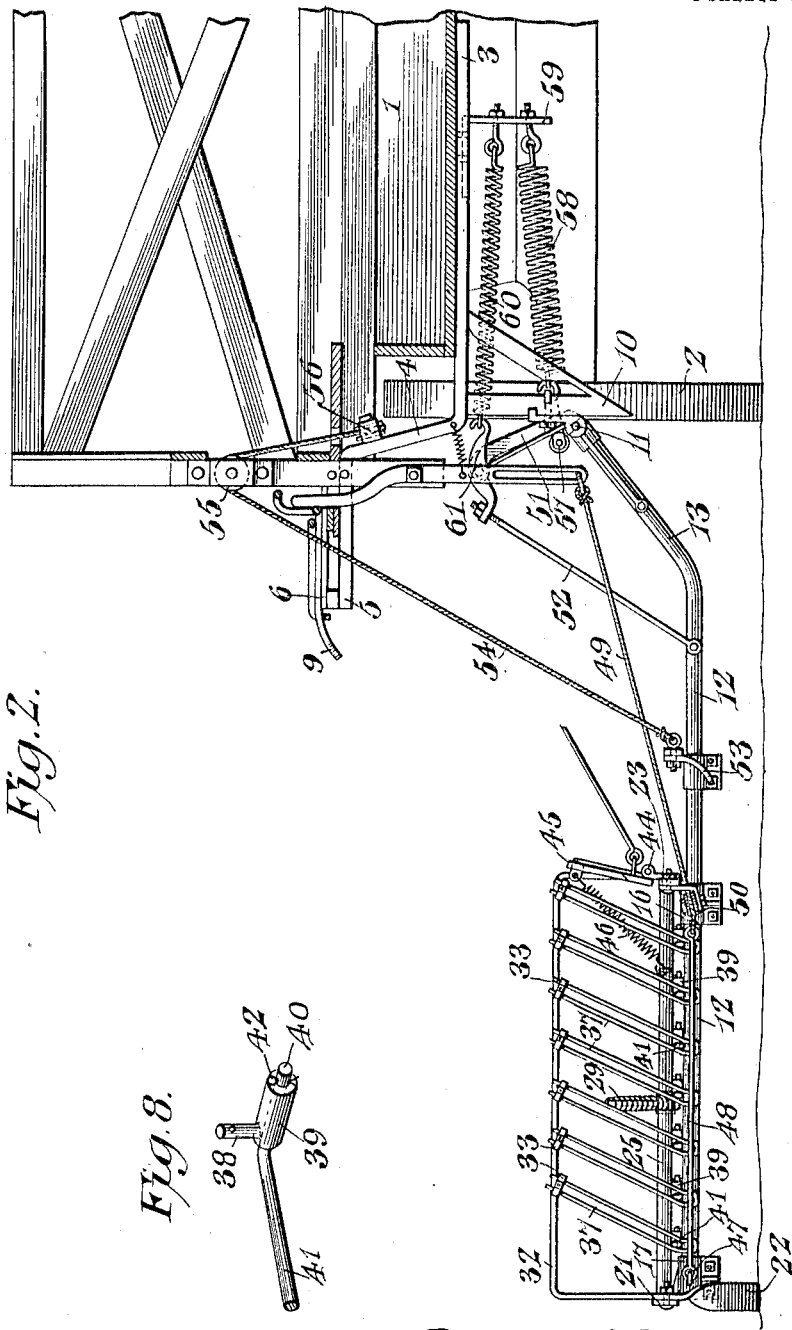

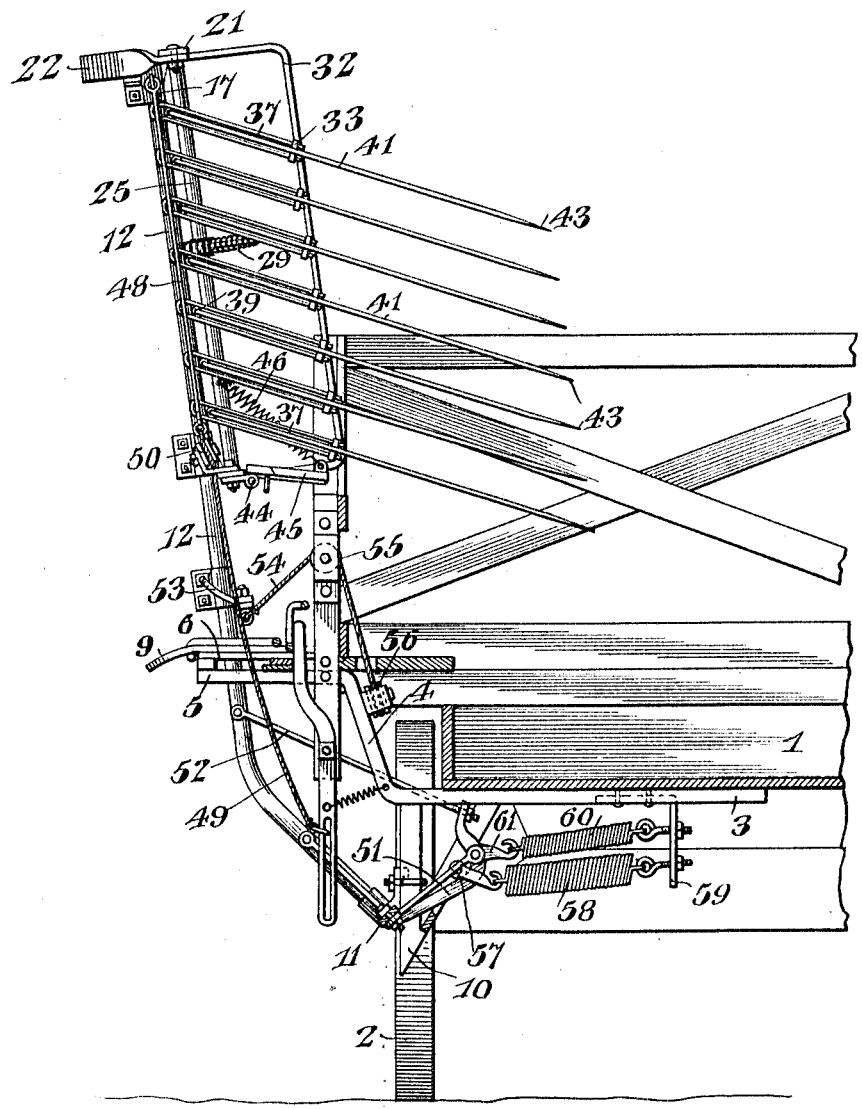

D. M. MYERS.
HAY AND GRAIN LOADER.
APPLICATION FILED JUNE 6, 1913.
1,105,916.
Patented Aug. 4, 1914.
4 SHEETS—SHEET 4.
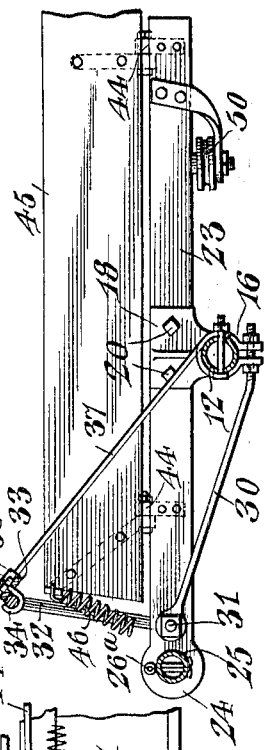
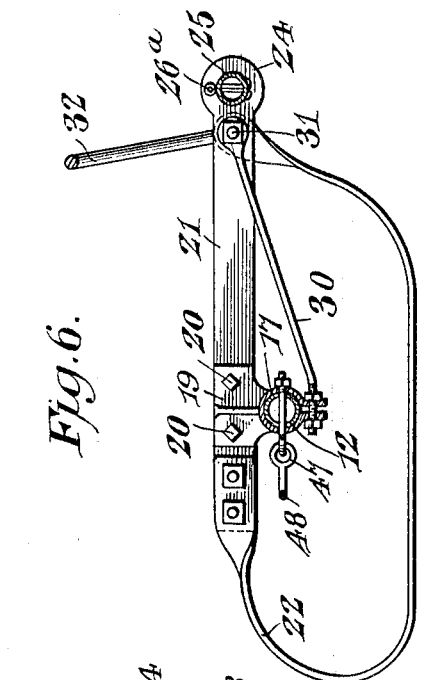
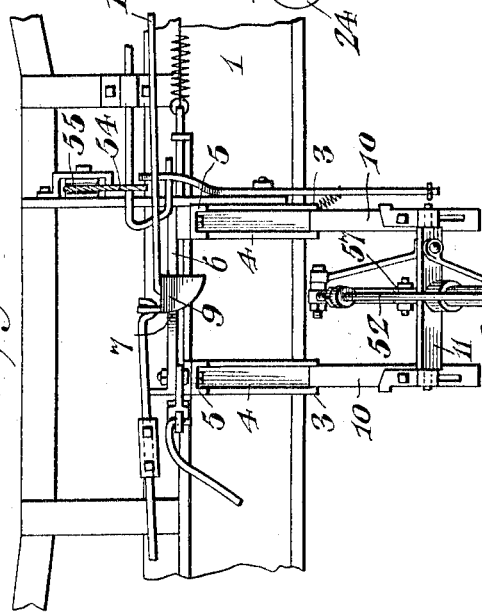
WITNESSES
David M. Myers, INVENTOR
BY
ATTORNEY

UNITED STATES PATENT OFFICE.

DAVID M. MYERS, OF CHASELEY, NORTH DAKOTA, ASSIGNOR TO MYERS MANUFACTURING COMPANY, OF FARGO, NORTH DAKOTA, A CORPORATION OF NORTH DAKOTA.

HAY AND GRAIN LOADER.

1,105,916.  Specification of Letters Patent.  Patented Aug. 4, 1914.

Application filed June 6, 1913. Serial No. 772,134.

*To all whom it may concern:*

Be it known that I, DAVID M. MYERS, a citizen of the United States, residing at Chaseley, in the county of Wells and State of North Dakota, have invented a new and useful Hay and Grain Loader, of which the following is a specification.

This invention has reference to improvements in hay and grain loaders, and is an improvement upon the structure shown in Letters Patent No. 1,019,344, granted March 5, 1912, upon an application filed by me. In said patent there is shown an attachment for an ordinary hay wagon, or as an attachment for or integral part of any appropriate vehicle, whereby on the progressive movement of the vehicle a loading mechanism is brought into engagement with shocks of grain or hay, so that such shocks are engaged and lifted as the vehicle progresses and are finally deposited on the vehicle, whereupon the mechanism becomes latched and only again moves into operative position at the volition of the operator or driver.

The present invention has to do with improvements in those parts of the loading mechanism which directly engage the shock or shocks, while in the main the operating mechanism whereby the loading devices are elevated and caused to dump their load, may follow the lines described in the said Letters Patent.

The invention will be best understood from a consideration of the following detailed description, taken in connection with the accompanying drawings forming a part of this specification, with the further understanding that while the drawings show a practical embodiment of the invention the latter is not confined to any strict conformity with the showing of the drawings but may be changed and modified so long as such changes and modifications mark no material departure from the salient features of the invention.

In the drawings:—Figure 1 is a plan view with parts broken away of so much of the hay and grain loader as has to do with the present invention. Fig. 2 is an elevation in part in section on the line 2—2 of Fig. 1. Fig. 3 is a section similar to that of Fig. 2, but showing the parts in a different operative position. Fig. 4 is a detail section on the line 4—4 of Fig. 1. Fig. 5 is a detail section on the line 5—5 of Fig. 1 but drawn on a larger scale. Fig. 6 is a detail section on the line 6—6 of Fig. 1 and drawn on the same scale as Fig. 5. Fig. 7 is a section on the line 7—7 of Fig. 1 and drawn on the scale of Fig. 5. Fig. 8 is a perspective view of the jointed end of one of the tines.

In the drawings there is shown a vehicle body 1 mounted upon wheels 2 and this vehicle body with the wheels may correspond to the structure shown in the aforesaid Letters Patent, wherefore no specific details of construction are herein shown or described, since such a showing and description would only tend toward confusion as to the present invention.

In the present structure there is a frame made up of side members 3 in underriding relation to the wagon body and which may be formed of angle metal having upturned ends 4 at one side of the wagon body terminating in substantially lateral extensions 5 which may project to one side of the wagon body and which support a platform 6 having a centrally disposed inset recess 7, while to the platform there is pivoted a latch 8 having a toothed end 9 movable across the recess 7. The side members of the frame 3 support downwardly extending or pendent brackets 10 between which extends and to which is pivoted a rock member 11 serving as a hinge. Fast to and projecting from the rock member 11 is a beam 12 having an angle or drop portion 13 adjacent to the rock member 11, the parts being so proportioned that the beam 12 may be lowered into close relation to the ground and substantially parallel therewith or may be lifted about the axis of the rock or hinge member 11 until the beam 12 is substantially upright. The substantially horizontal position of the beam 12 is shown in Fig. 2 and the upright position is shown in Fig. 3, in which latter case the beam 12 enters the recess 7 and is engaged by the nose end 9 of the latch lever 8, whereby the beam 12 is held in the upright position to be released therefrom at the will of an operator by means of a connecting link 14 leading to a lever 15 at the front of the wagon body, which lever may be under the control of an operator. The latching and releasing structure may follow the lines disclosed in the aforesaid Letters Patent, and hence is only generally shown in the drawings hereto attached, and needs no further description.

The beam 12 which may be in the form of a metal pipe of suitable size, or may be of any other suitable structure, but preferably of metal, is of sufficient length to extend an appropriate distance to one side of the vehicle and constitutes the support and carrier for the shock engaging and elevating means which so far as the general operation is concerned may be similar to the like structure of the aforesaid Letters Patent, but in accordance with the present invention this shock engaging and elevating means differs in numerous particulars from the disclosure of the aforesaid patent and constitutes one part of the present invention.

At spaced points on the beam or bar 12 there are secured clips 16, 17, which may form parts of respective brackets 18, 19. Fast to the bracket 19 by bolts 20 or otherwise is a bar 21 to which near respective ends thereof are attached corresponding ends of a runner or shoe 22 of appropriate size and shape to bear upon the ground when the beam 12 is lowered and support the corresponding end of the beam, this being the outer end of the beam or that end most distant from the vehicle. The bracket 18 is fast to a bar 23 at a point about midway of the length thereof, and the corresponding ends of the bars 21 and 23 are formed with enlargements 24 through which are produced holes serving to support, and in which are mounted the ends of a rod or pipe 25 held therein by cotter pins 26a or in any other appropriate manner preventing longitudinal movement of this rod in the supports or bearings 24. At any suitable point, but preferably about midway of the rod 25 there is secured thereto an arm 26 by means of a clip 27 which may form part of the arm and be clamped to the rod by a bolt 28 or in any other appropriate manner. Fast at one end to the end of the arm 26 remote from the rod 25 is a spring 29 and the other end of the spring is made fast to the beam 12, the tendency of the spring being to hold the rod 25 in a certain position but yieldable to a rocking movement of the rod for an appropriate distance. Clips 16 and 17 are each connected to the respective bars 21 and 23 by a brace rod 30 and each brace rod is connected to the respective bar at the end remote from the respective clip by a bolt 31 which may serve as a fastening means for an arch member 32 rising from the respective bars 21 and 23 near the eyes 24 and extending across the space between the bars 21 and 23 at a suitable height above the level of the beam 12 when the latter is in horizontal position. Secured at intervals along the yoke portion of the arch 32 are clamp blocks 33 each held to the yoke by a hook bolt 34 traversing the block 33 and provided with a holding nut 35. These blocks have eye portions 36 on opposite sides of the bolt 34 and lodged in these eye portions are the ends of rods 37 secured at the ends remote from the blocks 33 to the beam 12 by clamp bolts 38. The rods 37 may each be in the form of an elongated U with the yoke held by the clamp bolt 38a and the ends of the legs by the clamp block 33, while the legs of the U are in close parallel relation, the purpose of these rods 37 being to serve as guides as will presently appear. The yoke portions of the guides 37 are farther from the vehicle body than the eye blocks 33 and, moreover, considering the beam 12 as horizontal these guides 37 rise from the beam 12 toward the yoke 32 which is back of the beam 12. These guides, therefore, have a slant to the rear and toward the vehicle body from the beam 12.

Produced through the rod or pipe 25 is a series of passages designed to receive angle necks 38 each projecting from a sleeve 39, the neck being traversed by a cotter pin 40a or other suitable means for holding the neck to the rod 25 against escape, but still permitting a rotation of the sleeve 39 about the longitudinal axis of the neck, which latter projects from the sleeve at substantially right angles to the longitudinal axis of the sleeve. Traversing each sleeve 39 is an angle extension 40 at one end of a tine 41, this angle extension being held in the sleeve by a cotter pin 42 or in any other appropriate manner permitting the tine 40 to move in the sleeve 39 about the longitudinal axis thereof with the extension 40 serving as a pivot. The tines are elongated and terminate in points 43 which may be in the nature of stabbing points and each tine is carried over the beam 12 through the space between a respective pair of guiding rods 37. The pivot or angle necks 38 are so related to the guiding rods 37 that when the tines 41 are resting on the beam 12 and the latter is horizontal and the sleeves 37 are all beneath or in under-riding relation to the rod 25, the tines are all in parallel relation and substantially parallel to the length of the vehicle body, so that the tines all point directly forward.

The bar 23 carries hinges 44 to which is secured a board 45, normally in an approximately upright position when the beam 12 is horizontal, although inclining somewhat toward the vehicle, but capable of yielding in the direction of the vehicle, since it is sustained in the approximately upright position by a spring 46 made fast at an appropriate point to the rod 25. Connected at one end to the clip 17 by an eye bolt 47 or otherwise, is a link 48 extending across the series of tines 41 above the same and at the other end connected to a strand 49 carried about a guide pulley 50. This strand is carried to appropriate mechanism which serves to trip parts acting to set the elevating devices in operation, so that when a shock is engaged by the tines 41 and passes along the tines until the link 48 is engaged, the latter will act upon the strand 49 to bring about the operations mentioned and which are fully described in the aforesaid Letters Patent.

Fast to the rock member 11 is an arm 51 extending therefrom at an angle, nearly a right angle, to the length of the extension 13 of the beam 12. This arm 51 has its free end connected to the beam 12 by a brace rod 52 and the construction is such that a force applied to the arm 51 will tend to raise the free end of the beam 12. There is, however, fast to the beam 12 an arm or bracket 53 having a strand 54 secured thereto and rising to a suitable height on the frame of the vehicle, and from thence passing over direction changing pulleys 55 and 56 to certain mechanism shown and described in the aforesaid Letters Patent for causing the elevation of the beam 12 and also for permitting it to drop. To ease the lowering movement of the beam 12 and to also facilitate the lifting of the beam the arm 51 is provided with a traveler 57 connected to one end of a stout spring 58, the other end of which is made fast to a bracket 59 beneath the body of the vehicle. The arrangement is such that as the beam 12 is turned on its hinge support to the elevated position the spring 58 acts with increasing leverage thereon due to the movement of the traveler 57 along the arm 51, while as the beam 12 is lowered the traveler approaches the pivot or hinge of the beam while the spring 58 is being extended, thus reducing the leverage of the spring as the force required for this extension becomes greater. The action of the spring 58 is nearly nullified by the time the beam 12 reaches its lowermost position and hence there is provided a second spring 60 which may be fast at one end to the bracket 59 and at the other end is fast to a pivoted link 61 which may be secured to the arm 51 at a suitable distance from the hinge or pivot support of the beam 12, wherefore the spring 60 is always active to approximately its full force under the degree of tension to which it is placed and therefore it aids materially in easing the lowering movement of the beam 12 and parts carried thereby, as well as contributing to the raising of the beam 12.

The raising of the shock engaging and elevating means is caused by the progressive movement of the vehicle acting upon the rope or cable 54 in a manner shown and described in the aforesaid Letters Patent, and, therefore, neither shown nor described in the present application. The lowering of the shock engaging and elevating means toward the ground is accomplished by gravity, but this movement is resisted by the springs 58 and 60, the latter being capable of resisting to near the full extent of the force of gravity acting upon the device during the fall of said device.

When the shock engaging and elevating means are in active position, shown in Figs. 1 and 2, the tines 41 are nearly or quite horizontal with the rod 25 so situated that the pivot supports made up of the sleeves 39 and necks 38 are in underriding relation to the rod, the front of those portions of the tines where projecting through the lower ends of the guides 37, resting on the beam or bar 12. In this position of the parts the tines or stabbing members 41 will engage a shock and enter the same until the shock reaches the link 48, whereupon the inertia of the shock causes through the rope or cable 49 the tripping of certain mechanism fully shown and described in the aforesaid Letters Patent to connect the rope or cable 54 to a winding mechanism, also shown in said Letters Patent, to lift the shock elevating means, together with the shock already engaged, such lifting motion being about the axis of the pivot support 11. This movement continues until the beam 12 is nearly upright, and those ends of the guides 37 which are uppermost when the shock engaging device is horizontal, begin to assume a position lower than the parts fast to the beam 12. The tines are loosely and universally connected to the bar 25 so that the weight of the shock acting upon the tines tends to cause the latter to travel along the guides 37 toward the then lower ends, thus swinging the shock about the pivot connections of the tines and the longitudinal axis of the bar 25 toward the rear of the vehicle and at the same time the tines move downwardly in the then declining guides until they reach the clips 33, by which time the tines themselves decline at such an angle that the shock will readily gravitate therefrom into the vehicle. So far as the general action of the tines is concerned, it is similar to the action of the tines shown and described in the aforesaid Letters Patent, but in the structure of the present application the pivot supports of the tines have movement in two axes with respect to the bar or rod 25, and also a movement about the longitudinal axis of the bar, so that the pivoted ends of the tines have movements about three axes and not only providing a support for the rear ends of the tines, but one of great flexibility and the spring 29 yields to the weight of the shock carried by the tines, as the latter move toward the clips 33, thus permitting the rocking movement of the bar or rod 25, but the reaction of the spring 29 returns the bar or rod 25 to its normal position when the tines are relieved from the weight of the shock of grain.

What is claimed is:—

1. A shock loading attachment for vehicles comprising a shock engaging and elevating means movable in action from a substantially horizontal position to a substantially upright position and having stabbing tines for engaging the shock, and a support for the rear ends of the tines to which the latter have pivot connections movable on each of two different axes and said support being movable as a whole upon another axis.

2. A shock loading attachment for vehicles, comprising a shock engaging and elevating means provided with stabbing tines each provided at the rear end with an angle extension, a pivot support for each tine having means for the pivotal mounting of the angle extension of the tine, and in turn provided with an extension constituting a pivotal mounting, and a supporting member common to all the tine supports and provided with supporting means in which it is movable on an axis differing from that of the axial movements of the pivotal supports for the tines.

3. A shock loading attachment for vehicles comprising a shock engaging and elevating means provided with stabbing tines for engaging the shock, a support common to all the tines at the ends thereof remote from the stabbing ends and comprising a rod or bar mounted for movement about a longitudinal axis, each tine having the end remote from its stabbing end turned at an angle, and a pivotal connection for each tine comprising a sleeve receiving the angle end of a tine and having a member extending at an angle therefrom and provided with a pivotal bearing in the rod or bar.

4. A shock loading attachment for vehicles comprising a shock engaging and elevating means provided with stabbing tines for engaging the shock, a support common to all the tines at the ends thereof remote from the stabbing ends and comprising a rod or bar mounted for movement about a longitudinal axis, each tine having the end remote from its stabbing end turned at an angle, and a pivotal connection for each tine comprising a sleeve receiving the angle end of a tine and having a member extending at an angle therefrom and provided with a pivotal bearing in the rod or bar, said rod or bar having elastic means for constraining it in one direction of movement about its longitudinal axis.

5. A shock loading attachment for vehicles comprising a beam connected to the vehicle for movement from a substantially horizontal position to a substantially upright position, said beam having bars connected thereto at spaced points, a rod or bar mounted in the first-named bars for movement about its longitudinal axis, an arm fast to said bar, a spring connected to the arm and to the beam for normally constraining the rod toward one limit of its movement, an arch member connected to the first-named bars adjacent the second-named bar, slanting guides extending between the arch member and the beam, and tines each pivotally connected at one end to the second-named bar and extending through the guides in the direction of travel beyond the beam.

6. A shock loading attachment for vehicles comprising a beam connected to the vehicle for movement from a substantially horizontal position to a substantially upright position, said beam having bars connected thereto at spaced points, a rod or bar mounted in the first-named bars for movement about its longitudinal axis, an arm fast to said bar, a spring connected to the arm and to the beam for normally constraining the rod toward one limit of its movement, an arch member connected to the first-named bars adjacent the second-named bar, slanting guides extending between the arch member and the beam, and tines each pivotally connected at one end to the second-named bar and extending through the guides in the direction of travel beyond the beam, each tine having its rear end bent at an angle and the pivotal connections for the tines each comprising a sleeve receiving the bent end of the tines and having an angle extension projecting through the second-named rod or bar in pivotal relation thereto.

7. A shock loading attachment for vehicles comprising a frame structure having a pivot support on the vehicle and movable about the pivot support to either a substantially horizontal position or a substantially upright position with relation to the vehicle, shock engaging stabbing fingers or tines movable by gravity toward a pendent position when the frame is in an upright position, and inclined guides for the stabbing fingers mounted on the frame, the stabbing fingers having a common mounting carried by the frame and movable with respect to the frame about an axis longitudinal to said mounting.

8. A shock loading attachment for vehicles comprising a frame structure having a pivot support with the vehicle and movable about the pivot support to either a substantially horizontal position or a substantially upright position with relation to the vehicle, and shock engaging tines hingedly connected at the butt ends to the frame and movable by gravity toward a pendent position when the frame is in an upright position, and inclined guides for the stabbing fingers mounted on the frame, the hinge connections of the stabbing fingers with the frame having a common mounting carried by the frame and movable with respect to the frame about an axis longitudinal to said mounting, and also provided with an elastic connection with the frame constraining the mounting toward one limit of movement and yieldable to permit the mounting to turn toward its other limit of movement.

9. A shock loading attachment for vehicles comprising a shock engaging and elevating means movable from a substantially horizontal to a substantially upright position and the reverse, a spring connected thereto and constructed to resist the lowering movement of the shock engaging means, and another spring also arranged to resist the lowering movement of the shock engaging means and mounted with relation thereto to vary its action upon said means in accordance with the relative position of the latter.

10. A shock loading attachment for vehicles comprising a frame in fixed relation to the vehicle, another frame pivoted to the first-named frame at one side of the vehicle and movable to a substantially horizontal position or a substantially upright position, stabbing tines carried by the second-named frame and movable by gravity into shock engaging position when the second-named frame is horizontal and into discharging position when the said frame is upright, a spring connected to the pivoted frame in substantially constant relation thereto and resistant to the lowering movement of the frame, and another spring connected to the second-named frame in changeable relation thereto and resistant to the lowering action of the frame, both springs being also connected to the first-named frame.

11. A shock loading attachment for vehicles comprising a frame movable to either a substantially horizontal or a substantially upright position, said frame including a beam having an angle portion, a hinge connection at the extremity of the angle portion and secured to the vehicle, an arm fast to the hinge connection of the beam to move therewith and extending at an angle to the first-named angle extension of the beam, a spring connected at one end to the vehicle and at the other end to the free end of the second-named angle extension, another spring connected at one end to the vehicle and at the other end connected to the second-named angle extension and movable therealong toward and from the hinge, means connected to the beam for raising and lowering the frame, and stabbing tines carried by the frame of which the beam forms a part and provided with hinged connections to said frame for movement to substantially horizontal active position or toward a pendent discharge position.

In testimony, that I claim the foregoing as my own, I have hereto affixed my signature in the presence of two witnesses.

DAVID M. MYERS.

Witnesses:
W. E. SCHREYER,
MORRIS T. BAKER.

---

Copies of this patent may be obtained for five cents each, by addressing the "Commissioner of Patents, Washington, D. C."